(12) United States Patent
Rimi et al.

(10) Patent No.: US 7,333,470 B2
(45) Date of Patent: Feb. 19, 2008

(54) PROCESS AND DEVICE FOR THE CELL SEARCH PROCEDURE IN CELLULAR COMMUNICATION SYSTEMS, COMPUTER PROGRAM PRODUCT THEREFOR

(75) Inventors: Francesco Rimi, Alcamo (IT);
Giuseppe Avellone, Palermo (IT);
Francesco Pappalardo, Paternò (IT);
Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 699 days.

(21) Appl. No.: 10/841,414

(22) Filed: May 7, 2004

(65) Prior Publication Data
US 2005/0002376 A1    Jan. 6, 2005

(30) Foreign Application Priority Data
May 7, 2003    (EP)    ................... 03425291

(51) Int. Cl.
*H04J 3/06*    (2006.01)
(52) U.S. Cl. .................. 370/350; 370/320; 370/335
(58) Field of Classification Search ................ 370/350, 370/320, 335, 342; 375/149, 132
See application file for complete search history.

(56) References Cited

U.S. PATENT DOCUMENTS 7,103,085 B1 *    9/2006    Dabak et al. ............... 375/132

2002/0064211 A1 *    5/2002    Chen et al. ................. 375/149

FOREIGN PATENT DOCUMENTS

WO    03/024000    3/2003

* cited by examiner

Primary Examiner—Joseph Feild
Assistant Examiner—Phuoc Doan
(74) Attorney, Agent, or Firm—Lisa K. Jorgenson; Allen, Dyer, Doppelt, Milbrath & Gilchrist, P.A.

(57) ABSTRACT

To execute the cell-search procedure in a cellular communication system (such as a system based upon the 3GPP TDD standard), there are available identification codes for the second step (slot synchronization) and for the third step (identification of the scrambling codes). The identification codes are identified by a process of correlation with the received signal and are used for obtaining from a correspondence table the parameters for the execution of the second step (CD) or of the third step (SCR). The correspondence table is stored in a reduced form by the identification, according to rules of symmetry and redundancy, of subtables designed to generate the entire table by appropriate combination operations. The search procedure in the correspondence table thus reduced is conveniently modified by the introduction of the combination operations. A preferential application is in mobile communication systems based upon standards such as UMTS, CDMA2000, IS95 or WBCDMA.

24 Claims, 2 Drawing Sheets

PROCESS AND DEVICE FOR THE CELL SEARCH PROCEDURE IN CELLULAR COMMUNICATION SYSTEMS, COMPUTER PROGRAM PRODUCT THEREFOR

FIELD OF THE INVENTION

The present invention relates to telecommunication techniques and has been developed for telecommunication systems based upon the Code-Division Multiple Access (CDMA) and Third-Generation Partnership Project Time Division Duplex (3GPP TDD) standard.

Reference will be made to the above mentioned systems, however, the scope of the invention is more general. The invention is applicable to all telecommunication systems including satellite-telecommunication systems and mobile cellular systems corresponding to the UMTS, CDMA2000, IS95 or WBCDMA standards.

BACKGROUND OF THE INVENTION

To enable acquisition of a base station by a mobile terminal included in a telecommunication system based upon the 3GPP standard TDD mode or the like, the corresponding receiver is to carry out the function of frame synchronization and identification of the so-called codegroup. Performing these functions is essential for the execution of the subsequent steps in the context of the cell-search system.

In particular, when a mobile terminal is turned on, it does not have any knowledge of the timing of the transmitting cell to which it is to be assigned. The 3GPP standard, therefore, proposes an initial cell-search procedure for acquiring the cell signal and synchronizing therewith.

The procedure basically comprises three steps, which in the TDD version are indicated as follows: Primary Synchronization Code Acquisition (first step); Codegroup Identification and Slot Synchronization (second step); and Downlink Scrambling Code, Basic Midamble Code Identification and Frame Synchronization (third step).

In the implementation of the second step described above it is assumed that the primary synchronization code, which indicates the position of the generic frame of the synchronization slot, has previously been acquired during the first step.

To obtain at this point the slot synchronization and identify the codegroup, to which the offset of the cell is associated, in the second step the Secondary Synchronization Channel (SSCH) is used. There are transmitted, in each synchronization slot, three secondary synchronization codes or words of 256 chips (i.e., letters), where the generic code is designated by Cm, with m ranging from 0 to 15.

In the known prior art approaches, for example from the international patent application No. WO 00/74276, execution of the second step of the cell search envisages that the secondary synchronization codes Cm, contained in the secondary synchronization channel (SSCH), will be extracted by a correlation process. The samples of the signal received are correlated with the possible secondary synchronization codes Cm transmitted on the SSCH. The set of three codes which presents the highest correlation energy is then identified, and the phases associated to the codes of the set of three are thus used for defining, according to the standard, the codegroup parameters and other parameters for frame synchronization, such as slot offset and frame number.

The above approach is schematically represented in the diagram of FIG. 1, where the reference number 10 designates a bank of twelve complex finite-impulse-response (FIR) filters, which are coupled to the twelve possible secondary synchronization codes SSC. The samples of the signal received r are sent at input to the bank 10 of complex FIR filters, and at the twelve outputs of the bank 10 there are generated signals indicating the correlation energies corresponding to the codes Cm, which are sent to a system for detection of the maximum value. The system is designated by 11.

The system for detection of the maximum value 11 determines the three codes Cm having the highest correlation energy, thus storing its relevant code Cm, its energy and its position or phase offset in the frame. The three codes Cm thus identified are sent to a comparison block designated by 12.

The block 12 performs an operation of comparison with a table which gives, according to the possible combinations of the phase offsets of the set of three codes Cm identified, phase offsets that are designated generically by $b_i$, and can assume the values +1, −1, +j and −j, of the corresponding codegroups CD, slot offset or offset time $t_{offset}$, i.e., temporal distance between start of a slot and start of the synchronization code, and frame_number FR (even or odd frame), which are then supplied at an output by the comparison block 12.

The approach according to the known art represented in FIG. 1 involves searching in the appropriate tables, which are stored. The tables enable, on the basis of the sets of three codes received on the SSCH, all the parameters of interest to be obtained. In the standard there are defined two possible cases of transmission of the SSCH.

In a first case, referred to as Case 1 in the 3GPP standard, the sequence associated to the SSCH is transmitted in just one slot for each frame. Illustrated therefore in TABLE 1 is the allocation table of codes Cm for the SSCH in the first case, hereinafter defined as a one-slot table.

TABLE 1

| Codegroup CG | Codeset CS | Frame 1 FR_1 | | | Frame 2 FR_2 | | | $t_{offset}$ |
|---|---|---|---|---|---|---|---|---|
| 0 | 1 | $C_1$ | $C_3$ | $C_5$ | $C_1$ | $C_3$ | $-C_5$ | $t_0$ |
| 1 | 1 | $C_1$ | $-C_3$ | $C_5$ | $C_1$ | $-C_3$ | $-C_5$ | $t_1$ |
| 2 | 1 | $-C_1$ | $C_3$ | $C_5$ | $-C_1$ | $C_3$ | $-C_5$ | $t_2$ |
| 3 | 1 | $-C_1$ | $-C_3$ | $C_5$ | $-C_1$ | $-C_3$ | $-C_5$ | $t_3$ |
| 4 | 1 | $jC_1$ | $jC_3$ | $C_5$ | $jC_1$ | $jC_3$ | $-C_5$ | $t_4$ |
| 5 | 1 | $jC_1$ | $-jC_3$ | $C_5$ | $jC_1$ | $-jC_3$ | $-C_5$ | $t_5$ |
| 6 | 1 | $-jC_1$ | $jC_3$ | $C_5$ | $-jC_1$ | $jC_3$ | $-C_5$ | $t_6$ |
| 7 | 1 | $-jC_1$ | $-jC_3$ | $C_5$ | $-jC_1$ | $-jC_3$ | $-C_5$ | $t_7$ |
| 8 | 1 | $jC_1$ | $jC_5$ | $C_3$ | $jC_1$ | $jC_5$ | $-C_3$ | $t_8$ |
| 9 | 1 | $jC_1$ | $-jC_5$ | $C_3$ | $jC_1$ | $-jC_5$ | $-C_3$ | $t_9$ |
| 10 | 1 | $-jC_1$ | $jC_5$ | $C_3$ | $-jC_1$ | $jC_5$ | $-C_3$ | $t_{10}$ |
| 11 | 1 | $-jC_1$ | $-jC_5$ | $C_3$ | $-jC_1$ | $-jC_5$ | $-C_3$ | $t_{11}$ |
| 12 | 1 | $jC_3$ | $jC_5$ | $C_1$ | $jC_3$ | $jC_5$ | $-C_1$ | $t_{12}$ |
| 13 | 1 | $jC_3$ | $-jC_5$ | $C_1$ | $jC_3$ | $-jC_5$ | $-C_1$ | $t_{13}$ |
| 14 | 1 | $-jC_3$ | $jC_5$ | $C_1$ | $-jC_3$ | $jC_5$ | $-C_1$ | $t_{14}$ |
| 15 | 1 | $-jC_3$ | $-jC_5$ | $C_1$ | $-jC_3$ | $-jC_5$ | $-C_1$ | $t_{15}$ |
| 16 | 2 | $C_{10}$ | $C_{13}$ | $C_{14}$ | $C_{10}$ | $C_{13}$ | $-C_{14}$ | $t_{16}$ |
| 17 | 2 | $C_{10}$ | $-C_{13}$ | $C_{14}$ | $C_{10}$ | $-C_{13}$ | $-C_{14}$ | $t_{17}$ |
| . | . | . | . | . | . | . | . | . |
| 20 | 2 | $jC_{10}$ | $jC_{13}$ | $C_{14}$ | $jC_{10}$ | $jC_{13}$ | $-C_{14}$ | $t_{20}$ |
| . | . | . | . | . | . | . | . | . |
| 24 | 2 | $jC_{10}$ | $jC_{14}$ | $C_{13}$ | $jC_{10}$ | $jC_{14}$ | $-C_{13}$ | $t_{24}$ |
| . | . | . | . | . | . | . | . | . |
| 31 | 2 | $-jC_{13}$ | $-jC_{14}$ | $C_{10}$ | $-jC_{13}$ | $-jC_{14}$ | $-C_{10}$ | $t_{31}$ |

The one-slot table illustrated in TABLE 1 comprises 6 columns corresponding to the codes, in which each element requires 6 bits: two bits for the phase and four bits for the code identifier. The column corresponding to the codegroup has 5-bit elements. The column for the offset time $t_{offset}$ has 12-bit elements, and the column for the codeset has a 1-bit element. The one-slot table therefore has a total size of 1728 bits.

In a second case, referred to as Case 2 in the 3GPP standard, the sequence is transmitted in two slots for each frame. The distance between the two slots are fixed at eight slots. Illustrated in TABLE 2 is the allocation table of the codes for the SSCH in the second case, hereinafter defined as a two-slot table.

On the basis of this information the signal received in the appropriate time window is correlated with the local replications of the four possible midamble codes, which come under the codegroup identified previously, by a search in an appropriate correspondence table. The scrambling codes SCR correspond to the cell are obtained.

The sequence or burst associated to the Primary Common Control Physical Channel (P-CCPCH), on which to perform the third step of the cell-search procedure, is transmitted concomitantly with the first SSCH of each frame. Shown in TABLE 3 is the allocation table for the third step of the cell search to be stored in the appropriate circuits.

TABLE 2

| Code-group | Code-set | Frame 1 | | | | | | Frame 2 | | | | | | $t_{offset}$ |
|---|---|---|---|---|---|---|---|---|---|---|---|---|---|---|
| CD | CS | Slot k | | | Slot k + 8 | | | Slot k | | | Slot k + 8 | | | |
| 0 | 1 | $C_1$ | $C_3$ | $C_5$ | $C_1$ | $C_3$ | $-C_5$ | $-C_1$ | $-C_3$ | $C_5$ | $-C_1$ | $-C_3$ | $-C_5$ | $t_0$ |
| 1 | 1 | $C_1$ | $-C_3$ | $C_5$ | $C_1$ | $-C_3$ | $-C_5$ | $-C_1$ | $C_3$ | $C_5$ | $-C_1$ | $C_3$ | $-C_5$ | $t_1$ |
| 2 | 1 | $jC_1$ | $jC_3$ | $C_5$ | $jC_1$ | $jC_3$ | $-C_5$ | $-jC_1$ | $-jC_3$ | $C_5$ | $-jC_1$ | $-jC_3$ | $-C_5$ | $t_2$ |
| 3 | 1 | $jC_1$ | $-jC_3$ | $C_5$ | $jC_1$ | $-jC_3$ | $-C_5$ | $-jC_1$ | $jC_3$ | $C_5$ | $-jC_1$ | $jC_3$ | $-C_5$ | $t_3$ |
| 4 | 1 | $jC_1$ | $jC_5$ | $C_3$ | $jC_1$ | $jC_5$ | $-C_3$ | $-jC_1$ | $-jC_5$ | $C_3$ | $-jC_1$ | $-jC_5$ | $-C_3$ | $t_4$ |
| 5 | 1 | $jC_1$ | $-jC_5$ | $C_3$ | $jC_1$ | $-jC_5$ | $-C_3$ | $-jC_1$ | $jC_5$ | $C_3$ | $-jC_1$ | $jC_5$ | $-C_3$ | $t_5$ |
| 6 | 1 | $jC_3$ | $jC_5$ | $C_1$ | $jC_3$ | $jC_5$ | $-C_1$ | $-jC_3$ | $-jC_5$ | $C_1$ | $-jC_3$ | $-jC_5$ | $-C_1$ | $t_6$ |
| 7 | 1 | $jC_3$ | $-jC_5$ | $C_1$ | $jC_3$ | $-jC_5$ | $-C_1$ | $-jC_3$ | $jC_5$ | $C_1$ | $-jC_3$ | $jC_5$ | $-C_1$ | $t_7$ |
| 8 | 2 | $C_{10}$ | $C_{13}$ | $C_{14}$ | $C_{10}$ | $C_{13}$ | $-C_{14}$ | $-C_{10}$ | $-C_{13}$ | $C_{14}$ | $-C_{10}$ | $-C_{13}$ | $-C_{14}$ | $t_8$ |
| 9 | 2 | $C_{10}$ | $-C_{13}$ | $C_{14}$ | $C_{10}$ | $-C_{13}$ | $-C_{14}$ | $-C_{10}$ | $C_{13}$ | $C_{14}$ | $-C_{10}$ | $C_{13}$ | $-C_{14}$ | $t_9$ |
| 10 | 2 | $jC_{10}$ | $jC_{13}$ | $C_{14}$ | $jC_{10}$ | $jC_{13}$ | $-C_{14}$ | $-jC_{10}$ | $-jC_{13}$ | $C_{14}$ | $-jC_{10}$ | $-jC_{13}$ | $-C_{14}$ | $t_{10}$ |
| 11 | 2 | $jC_{10}$ | $-jC_{13}$ | $C_{14}$ | $jC_{10}$ | $-jC_{13}$ | $-C_{14}$ | $-jC_{10}$ | $jC_{13}$ | $C_{14}$ | $-jC_{10}$ | $jC_{13}$ | $-C_{14}$ | $t_{11}$ |
| 12 | 2 | $jC_{10}$ | $jC_{14}$ | $C_{13}$ | $jC_{10}$ | $jC_{14}$ | $-C_{13}$ | $-jC_{10}$ | $-jC_{14}$ | $C_{13}$ | $-jC_{10}$ | $-jC_{14}$ | $-C_{13}$ | $t_{12}$ |
| 13 | 2 | $jC_{10}$ | $-jC_{14}$ | $C_{13}$ | $jC_{10}$ | $-jC_{14}$ | $-C_{13}$ | $-jC_{10}$ | $jC_{14}$ | $C_{13}$ | $-jC_{10}$ | $jC_{14}$ | $-C_{13}$ | $t_{13}$ |
| 14 | 2 | $jC_{13}$ | $jC_{14}$ | $C_{10}$ | $jC_{13}$ | $jC_{14}$ | $-C_{10}$ | $-jC_{13}$ | $-jC_{14}$ | $C_{10}$ | $-jC_{13}$ | $-jC_{14}$ | $-C_{10}$ | $t_{14}$ |
| 15 | 2 | $jC_{13}$ | $-jC_{14}$ | $C_{10}$ | $jC_{13}$ | $-jC_{14}$ | $-C_{10}$ | $-jC_{13}$ | $jC_{14}$ | $C_{10}$ | $-jC_{13}$ | $jC_{14}$ | $-C_{10}$ | $t_{15}$ |
| 16 | 3 | $C_0$ | $C_6$ | $C_{12}$ | $C_0$ | $C_6$ | $-C_{12}$ | $-C_0$ | $-C_6$ | $C_{12}$ | $-C_0$ | $-C_6$ | $-C_{12}$ | $t_{16}$ |
| . | . | . | . | . | . | . | . | . | . | . | . | . | . | . |
| . | . | . | . | . | . | . | . | . | . | . | . | . | . | . |
| 23 | 3 | $jC_6$ | $-jC_{12}$ | $C_0$ | $jC_6$ | $-jC_{12}$ | $-C_0$ | $-jC_6$ | $jC_{12}$ | $C_0$ | $-jC_6$ | $jC_{12}$ | $-C_0$ | $t_{20}$ |
| 24 | 4 | $C_4$ | $C_8$ | $C_{15}$ | $C_4$ | $C_8$ | $-C_{15}$ | $-C_4$ | $-C_8$ | $C_{15}$ | $-C_4$ | $-C_8$ | $-C_{15}$ | $t_{24}$ |
| . | . | . | . | . | . | . | . | . | . | . | . | . | . | . |
| . | . | . | . | . | . | . | . | . | . | . | . | . | . | . |
| 31 | 4 | $jC_8$ | $-jC_{15}$ | $C_4$ | $jC_8$ | $-jC_{15}$ | $-C_4$ | $-jC_8$ | $jC_{15}$ | $C_4$ | $-jC_8$ | $jC_{15}$ | $-C_4$ | $t_{31}$ |

The two-slot table illustrated in Table 2 comprises 12 columns corresponding to the codes in which each element requires 6 bits: two bits for the phase and four bits for the code identifier. The column corresponding to the codegroup CD has 5-bit elements. The column for the $t_{offset}$ has 12-bit elements, and the column for the codeset CS has 1-bit elements. The two-slot table therefore has a total size of 2912 bits.

An example of the second case is provided in FIG. 2, where there is a schematic representation of a frame TDD, which may, for example, be the frame FR_1, made up of a number of slots, including the two slots k and k+8. Also indicated in exploded form in FIG. 2 are the contents of the slot k+8, which comprises the primary channel indicated by its code Cp and the SSCH, made up of the codes Cm appearing in TABLES 1 and 2 and of the corresponding phases $b_i$, which can assume the values +1, −1, +j, −j.

Likewise, for the third step of the cell-search procedure it is assumed that all the necessary information has received from the preceding step, including the codegroup CD.

TABLE 3

| | | | Associated Codes | | |
|---|---|---|---|---|---|
| CELL PARAMETER | Code-group CD | Scrambling Code SCR | Long Basic Midamble Code mPL | Short Basic Midamble Code mSL | $t_{offset}$ |
| 0 | Group 0 | Code 0 | $m_{PL0}$ | $m_{SL0}$ | $t_0$ |
| 1 | | Code 1 | $m_{PL1}$ | $m_{SL1}$ | |
| 2 | | Code 2 | $m_{PL2}$ | $m_{SL2}$ | |
| 3 | | Code 3 | $m_{PL3}$ | $m_{SL3}$ | |
| 4 | Group 1 | Code 4 | $m_{PL4}$ | $m_{SL4}$ | $t_1$ |
| 5 | | Code 5 | $m_{PL5}$ | $m_{SL5}$ | |
| 6 | | Code 6 | $m_{PL6}$ | $m_{SL6}$ | |
| 7 | | Code 7 | $m_{PL7}$ | $m_{SL7}$ | |
| . | | | | | |
| . | | | | | |
| 124 | Group 31 | Code 124 | $m_{PL124}$ | $m_{SL124}$ | $t_{31}$ |
| 125 | | Code 125 | $m_{PL125}$ | $m_{SL125}$ | |
| 126 | | Code 126 | $m_{PL126}$ | $m_{SL126}$ | |
| 127 | | Code 127 | $m_{PL127}$ | $m_{SL127}$ | |

The above stored tables may involve, in the circuits provided, a need for a considerable amount of memory, above all in the perspective of multimode implementation of the future mobile terminals.

SUMMARY OF THE INVENTION

An object of the present invention is to perform the above described functions in a more compact way, so as to be able to provide, for example, a search of the codegroup and/or of the scrambling codes by hardware that reduces the memory required, the area occupied on the chip, and the power consumption.

According to the present invention, such an object is achieved by a method for performing a cell search in a cellular communication system in which there are available synchronization sequences comprising synchronization codes for seeking correspondence in a received signal. The method includes identifying the synchronization codes received based upon a correlation process between the synchronization codes and the received signal. The method may further include obtaining from a correspondence table parameters for the cell search based upon the synchronization codes by identifying in the correspondence table at least one sub-table for reproducing the correspondence table based upon combination operations, storing the sub-tables and eliminating remaining parts of the correspondence table, and executing a search on the sub-tables. Included in the search is the combination operations to reproduce the entire correspondence table.

The invention also relates to a corresponding device, as well as a computer program product directly loadable into the memory of a computer. The computer product comprises portions of software code that implement the method of the invention when the product is run on a computer.

The approach according to the invention simplifies the size of the memory based upon a reduction in the size of the tables to be stored. As compared to the known approaches, the approach proposed herein, which is based upon a technique of recycling the data acquired is straightforward, occupies less area, and consumes less power.

In particular, the memories used for storage of the standard simplify the architecture of the system by exploiting the symmetries and the redundancies of the parameters in the tables corresponding to the second and third steps of the cell-search procedure and by basing the simplification on the knowledge of a set of additional information. This additional information may, for example, be the information on the codeset received, which is available at the moment in which the search procedure is performed on the tables.

In other words, by way of the symmetries and redundancies, it is possible to identify subtables, which can be stored with a smaller number of rows and columns as compared to the original table. It is moreover possible to infer from the symmetries and redundancies combination operations that, when applied to the subtables, enable generation of the entire original table.

The approach described herein modifies the search procedure depending upon the operations of simplifying and the reduction of the stored tables, i.e., by introducing the above-mentioned combination operations in the search procedure that operates on the subtables.

BRIEF DESCRIPTION OF THE DRAWINGS

The invention will now be described, purely by way of a non-limiting example, with reference to the annexed drawings, in which FIGS. 1 and 2 correspond to the invention.

DETAILED DESCRIPTION OF THE PREFERRED EMBODIMENTS

Figure 1:
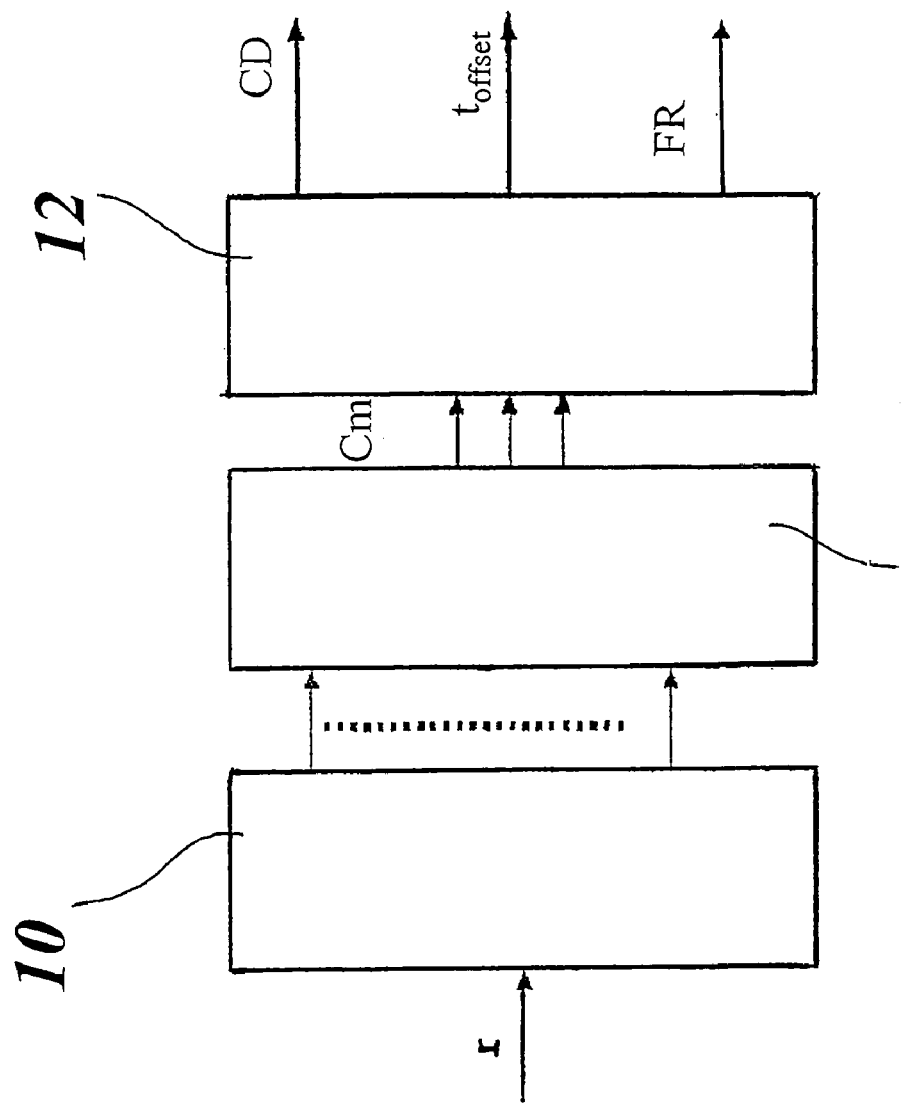
Figure 2:
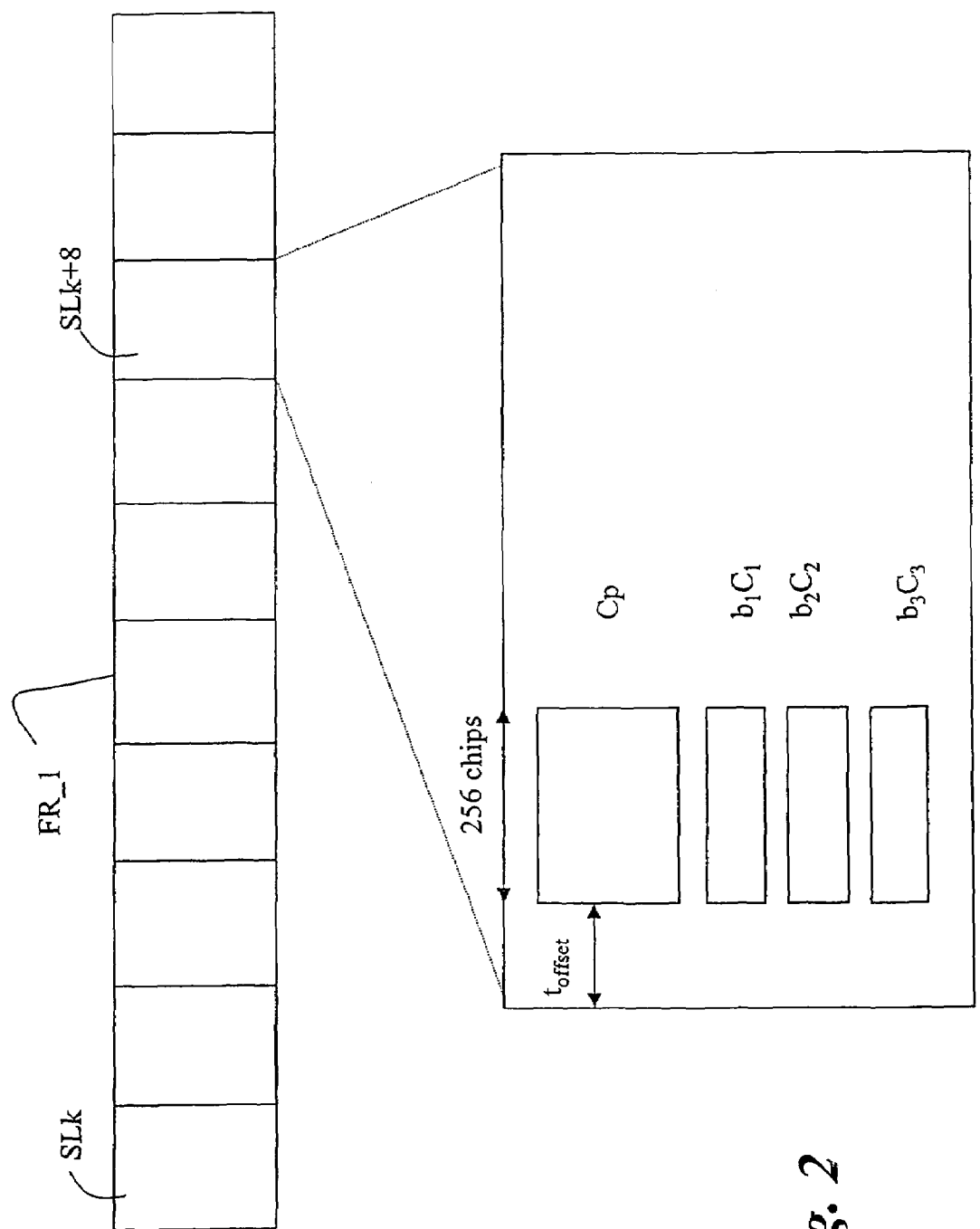

There now follows a description of the operations for simplifying and reducing the tables. In regards to the one-slot table illustrated in TABLE 1, corresponding to the first case in which the sequence associated to the SSCH is transmitted in just one slot for each frame, it is possible to carry out the following operations:

a) eliminating the column corresponding to the codegroup CD, by obtaining the value of the codegroup CD from the row index, designated by a;

b) eliminating the column corresponding to the offset time $t_{offset}$, by obtaining the offset time from the row index by way of the following relation, where a is the row index:

$$toffset = \begin{cases} 48 \cdot a, a < 16 \\ 720 + 48 \cdot a, a \geq 16 \end{cases}$$

c) reducing the table to just the sixteen rows that contain the first instance of a combination of phases. In fact, the combinations of phases contained in the first sixteen rows are repeated in the subsequent sixteen rows, with just the change of the associated set of three codes. The table can thus be reduced to just sixteen rows by exploiting the prior knowledge of the codeset for reconstructing the part of table that may possibly be missing. Note that, in this case, in the foregoing relation for $t_{offset}$ the parameter a is linked to the row index no longer by an equality but by the following expression:

$a = \text{row\_index} + 16 * \text{codeset} = \text{codegroup},$ where the parameter codeset assumes the value 0 or 1;

d) eliminating the columns of the second frame FR_2 that are identical to the columns of the first frame FR_1. The columns are, in particular, the first two; and e) modifying the search procedure by introducing the information that the last column of the second frame FR_2 differs from the last column of the first frame FR_1 only in regards to the sign, and eliminating the last column of the second frame FR_2.

By applying all the operations listed above, the one-slot table, which initially comprised (see TABLE 1) 32 rows and 9 columns, is reduced to a subtable having the dimensions of 16 rows by 3 columns.

In regards to the two-slot table illustrated in TABLE 2, corresponding to the second case, in which the sequence associated to the SSCH is transmitted in two slots for each frame, it is likewise possible to carry out the following operations:

a) eliminating the column corresponding to the codegroup CD by obtaining the value of the codegroup CD from the row index;

b) eliminating the column corresponding to the offset time $t_{offset}$ by obtaining the offset time from the row index by the following relation, where a is the row index:

$$toffset = \begin{cases} 48 \cdot a, a < 16 \\ 720 + 48 \cdot a, a \geq 16 \end{cases}$$

c) reducing the table to just the eight rows that contain the first instance of a combination of phases. In fact, the combinations of phases contained in the first eight rows are repeated in the next rows in groups of eight, with the change of just the associated set of three codes. The table, therefore, can be reduced to just eight rows. Note that, in this case, in the foregoing relation for $t_{offset}$, the parameter a is linked to the row index no longer by an equality but by the following expression:

$$a = \text{row\_index} + 8*\text{codeset} = \text{codegroup},$$

where the parameter codeset can assume the value 0, 1, 2, or 3;

d) eliminating two columns of the slot k+8 that are identical to the columns of the slot k. The columns are, in particular, the first two;

e) modifying the search procedure by introducing the information that the last column of the slot k+8 differs from the last column of the slot k only in regards to the sign, and eliminating the last column of the slot k+8; and f) modifying the search procedure by introducing the information that the first two columns of the slot k of the first frame FR_1 differ from the first two columns of the slot k+8 of the second frame FR_2 only in regards to the sign and the information that the two third columns are identical, and eliminating the first two columns of the slot k of the second frame FR_2.

By applying all the operations listed above, the two-slot table of the second case, which initially comprised (see TABLE 2) 32 rows and 15 columns, is reduced to a subtable having 8 rows and 3 columns.

In addition, from an examination of the one-slot table and the two-slot table, reduced by the operations described above, it may be noted that it is possible to store just one of the two tables. In fact, the remaining table is obtainable by the following operations:

g) mapping the sets of three of the rows 0,1,4,5,8,9,12,13 of the one-slot table in the rows corresponding to the first frame FR_1 of the two-slot table. In fact, the columns that in the first case came under the first frame FR_1, in the second case become the columns coming under the slot k, while those of the second frame FR_2 of the first case become the columns of the slot k+8; and h) mapping the sets of three remaining codes in the sets of three corresponding to the second frame FR_2, reversing their position in pairs: 3, 2, 7, 6, 11, 10, 15, 14. The columns corresponding to the first frame in the first case become the columns corresponding to the slot k, while the columns corresponding to the second frame in the first case become the columns of the slot k+8.

In this way, it is possible to store just one of the two tables and obtain therefrom the remaining table. In particular, it is preferable to store just the two-slot table, reduced to eight rows and three columns, and to obtain the table of the first case by introducing the appropriate modifications to the search procedure according to what has been described above and what will be described in further detail below.

In regards to the third step of the cell-search procedure, it is possible to apply to the table represented in TABLE 3 some of the operations described above for the tables of the second step of the cell search. In this way there is obtained a table containing just columns corresponding to the scrambling codes and to the two types of midambles.

This means in particular eliminating the columns of the codegroup and of the time offset $t_{offset}$, because the values have been estimated in the previous step and stored in two appropriate registers or memory cells, and eliminating the column of the cell parameter that is identifiable on the basis of the value of the row for which there is the maximum correlation with the signal received on the P-CCPCH. The relation which, on the basis of the codegroup CD, identifies the four possible basic midambles (and corresponding scrambling codes) as row index of the reduced TABLE 3 is the following: CD*4+I, with I being an index that ranges from 0 to 3. It is pointed out that, designating by $I_{max}$ the value of the index I for which the maximum correlation is obtained between the midamble received on the P-CCPCH and the four possible values associated to the codegroup CD identified in the preceding step, the value of the cell parameter remains defined by the following relation: CD*4+$I_{max}$. Clearly, the advantage in terms of reduction of the memory that is obtained for the third step is much lower than the one obtained for the second step of the cell-search procedure.

There now follows a description of the modifications to be introduced in the search procedures for the second step of the cell-search procedure in the tables that are reduced according to the operations described previously. To start with, the first case is examined, in which the SSCH is transmitted in just one slot per frame.

In regards to the implementation of the operations a) and b), which eliminate columns exploiting the row index, as well as implementation of the operation c), which reduces the table to just the sixteen rows that contain the first instance of a combination of phases, the operations constitute a first reduction step that brings about reduction from 32 rows and 9 columns to 16 rows and 6 columns (384 bits). The search procedure has to scan the entire reduced table, comparing the sets of three contained therein with the set of three estimated on the basis of the samples received by the system. In addition, it must obtain the remaining information on the basis of the relations described previously. It is to be noted that halving the rows of the table with respect to the initial issue already entails a considerable saving in so far as the accesses to the memory are halved, with corresponding stall times and occupancy of data buses.

This entails the introduction of the following steps in the search procedure: identifying the codegroup on the basis of the row address of the set of three codes that presents the best correlation (or coincides) with the set of three estimated on the basis of the samples received: codegroup=row_index+16*codeset; and calculating the offset time $t_{offset}$ on the basis of the relation:

$$toffset = \begin{Bmatrix} 48 \cdot a, \; codeset = 0 \\ 720 + 48 \cdot a, \; codeset = 1 \end{Bmatrix}.$$

It is to be noted that if the codeset is known, and the codes are identified according to the corresponding position in the generic codeset, there does not exist any problem in regards to the loading of the reduced table; i.e., the rows linked to the value of the corresponding codeset are just selected, according to the relations given above. In addition, in order to understand the expression of the calculation of the codegroup, it is to be noted that the codeset value ranges between 1 and 2 in the first case, which in binary form is represented by 0 and 1.

The application of the first reduction step, as compared to the implementation according to the known art, involves the reduction of the accesses to memory and of the corresponding latencies. The operations necessary for the search procedure comprise comparisons, two operations of addition, and two operations of multiplication, i.e., operations, which are not very complex and are fast for the DSP devices and microprocessors available in the receiving apparatus. The frame-number is determined by the set of columns in which the highest correlation between the set of three estimated and the set of three stored has been found.

The pseudocode of the steps to be introduced in the first case is the following that is the same search procedure as that of the standard case performed now on 16 rows and not on 32.

```
if (codeset)
    codegroup = row_index + 16
    t_offset = 720 + 48*codegroup
else
    codegroup = row_index
    t_offset = 48*codegroup
```

In regards to the implementation of operation d), which eliminates the columns of the second frame FR_2 that are identical to the columns of the first frame FR_1, the columns namely being the first two, this constitutes a second reduction step that brings about a reduction from 16 rows by 6 columns to 16 rows by 4 columns (256 bits).

In this case, in addition to the part introduced in the preceding approach, it is necessary to introduce the following additional steps for reconstructing the redundant information eliminated from the second frame FR_2:

Reading an entire row of the table (4 cells of 4 bits each, two for the phase and two for the position of the code in the codeset);

Comparing the first 3 cells, which represent the subcase corresponding to the first frame FR_1 (i.e., odd frame), with the estimate made, and evaluating the correlation or the coincidence of the two sets of three, possibly updating the variables of the maximum correlation (row_index, frame_num, cor_value);

Comparing the first two cells and the fourth cell, which represent the subcase corresponding to the second frame FR_2 (i.e., even frame), with the estimate made, and evaluating the correlation or the coincidence between the two sets of three, possibly updating the variables of the maximum correlation (row_index, frame_num, cor_value); and Repeating the preceding steps until all the possible cases have been verified, and finally using the values stored in row_index, frame_num, cor value in the calculations defined previously for the operations a), b) and c).

It is to be noted that it would in any case be necessary to carry out the control on the two subcases, but now, instead of loading six cells for each row of the table, the computer that executes the operation loads four, and thus there are fewer data traveling on the bus. Furthermore, by writing the code appropriately, the subcase corresponding to the second frame can be verified with just one comparison.

The pseudocode of the steps to be introduced is the following:

```
for (i = 0; i<16; i++) {
    read_row ( )        -- reads the cells of one row of
                           the table and puts them in a
                           four-cell register; before it
                           would have loaded six cells
    compare (0, 1, 2, Temp)  -- compares the first 3
                           cells with the 3 cells of
                           the estimate derived from
                           the samples received
    if (Temp>cor_value) {
        cor_value = Temp    -- Note that it is
        frame_num = 0           necessary to specify
        row_index = i           appropriately where
    }                           to read the data in the
                                temporary register, while
                                the two comparison
                                operations should in any
                                case be performed.
                           -- Note: the variable Temp
                              behaves as metric indicating
                              the "distance" between the
                              estimate and the value taken
                              from the table.
    compare (0, 1, 3, Temp)
    if (Temp>cor_value) {
        cor_value = Temp
        frame_num = 1
        row_index = i
    }
}
```

In regards to the implementation of the operation e), which modifies the search procedure by introducing the information that the last column of the second frame FR_2 differs from the last column of the first frame FR_1 only in regards to the sign and eliminates the last column of the second frame FR_2, this constitutes a third reduction step that determines a reduction to 16 rows by 3 columns (192 bits).

If the four possible phases are represented by integers from 0 to 3, there is, for example, the following passage: col-3=1=>col-4=3. In the two-bit binary representation, this implies adding a 1 to the most significant digit, excluding the possible carry (or even negating the most significant digit).

The pseudocode for the first case would become the following type:

```
for (i = 0; i<16; i++) {
    read_row ( )        -- reads the cells of one row
                           of the table and puts them in a
                           three-cell register; before it
                           would have loaded four cells.
    compare (A, Temp)   -- compares the 3 cells taken
                           from the table set in register
                           A with the 3 cells of the
                           estimate derived from the
                           samples received.
    if (Temp>cor_value) {
        cor_value = Temp    -- Note that it is necessary
        frame_num = 0           to specify appropriately where
        row_index = i           to read the data in the
                                temporary register, whereas the
                                two comparison operations
                                should in any case be performed
    }
    A[2] = -A[2]        --This inversion of sign will
                           in effect be made as described
                           previously
    compare (A, Temp)
    if (Temp>cor_value) {
        cor_value = Temp
        frame_num = 1
        row_index = i
    }
}
```

There now follows an examination of the second case, in which the SSCH is transmitted in two slots per frame.

In regards to the implementation of operations a) and b), which eliminate columns, exploiting the row index, as well as of operation c), which reduces the table to just the eight rows that contain the first instance of a combination of phases, these operations constitute a first reduction step similar to the one for the first case, bringing about reduction from 32 rows and 15 columns to 8 rows and 12 columns (384 bits). The search procedure is very similar to the one delineated for the first case, with the difference that there are four comparisons (two comparisons on slot_number for each frame_number), and the row to be read will comprise twelve cells (optionally, it would be possible to use the same "pseudofunction" as that of the first case, with two cycles of reading from memory, or else create a pseudofunction of access to memory with appropriate parameters regarding the cells to be loaded).

It is to be noted that all these operations should in any case be executed. What changes with respect to integral storage according to the known art is the following: the total reading cycles (there has been a passage from 32 rows to just 8 rows to be read); the relation for obtaining the codegroup; and the relation for obtaining the offset time $t_{offset}$. The latter two relations are given below:

codegroup = row_index + 8*codeset, codeset=0,1,2,3
{

$$toffset = \begin{Bmatrix} 48 \cdot a, a < 16 \\ 720 + 48 \cdot a, a \geq 16 \end{Bmatrix}$$

The pseudocode of the steps to be introduced, for the second case, is the following:

codegroup = row_index+8*codeset
if (codeset<2)
    t_offset = 48*codegroup
else
    t_offset = 720 + 48*codegroup In regards to the implementation of operation d) of the second case, which eliminates the columns of the slot k+8 that are identical to the columns of the slot k, the columns being, namely, the first two, this constitutes a second reduction step that brings about a reduction from 8 rows by 12 columns to 8 rows by 8 columns (256 bits).

The above implementation is similar to that of the operation d) for the first case, given that now the operations of simplification refer to the subcases slot_k and slot_k+8 of each frame.

In order to make all the comparisons, thus reconstructing the redundant information eliminated in the case slot_k+8, the process operates as follows, in a way similar to that of the first case:

An entire row of the table is read (8 cells of 4 bits each, two for the phase and two for the position of the code in the codeset);

The first 3 cells, which represent the subcase frame_1/slot_k (i.e., odd frame, first slot in position k), are compared with the estimate made, and the correlation or coincidence between the two sets of three is evaluated; the variables of the maximum correlation (row_index, frame_num, cor_value, slot_num) are possibly updated;

The first two cells and the fourth cell, which represent the subcase frame_1/slot_k+8 (i.e., odd frame, second slot in position k+8), are compared with the estimate made, and the correlation or the coincidence between the two sets of three is evaluated; the variables of the maximum correlation (row_index, frame_num, cor_value, slot_num) are possibly updated;

The comparison is made for the cells from 58 to 78 (case frame_2/slot_k), and the corresponding updates are made, if necessary;

The comparison is made for the cells 5, 6 and 8 (case frame_2/slot_k+8), and the corresponding updates are made, if necessary; and The steps referred to above are repeated until all the possible cases have been verified; at the end the values stored in row_index, frame_num, cor_value, slot_num are used in the calculations for the preceding operations of reduction.

The pseudocode is the following:

```
for (i = 0; i<8; i++) {
read_row ( )  -- reads the cells of a row of the
                 table and puts them in an 8-cell
                 register; before it would have
                 loaded 12 cells
compare (0,1,2, Temp)  -- compares the first 3
                          cells with the 3 cells of
                          the estimate derived from
                          the samples received
if (Temp>cor_value) {
    cor_value = Temp      -- Note that it is necessary
    frame_num = 0         to specify appropriately
    row_index = i         where to read the data in
    slot_num = 0          the temporary register, whereas
                          the two comparison operations
}                         should in any case be made
compare (0,1, 3, Temp)
if (Temp>cor_value) {
    cor_value = Temp
    frame_num = 0
    row_index = i
    slot_num = 1
}
compare (4,5,6, Temp)
if (Temp>cor_value) {
    cor_value = Temp
    frame_num = 1
    row_index = i
    slot_num = 0
}
compare (4,5,7, Temp)
if (Temp>cor_value) {
    cor_value = Temp
    frame_num = 0
    row_index = i
    slot_num = 1
}
}
```

In regards to the implementation of operation e), which modifies the search procedure by introducing the information that the last column of the slot k+8 differs from the last column of the slot k only as regards the sign and eliminates the last column of the slot k+8, this constitutes a third reduction step that determines a reduction from 8 rows by 8 columns to 8 rows by 6 columns (192 bits).

The implementation of the second case is similar to that of the first case, given that now the operations of simplification refer to the subcases slot_k and slot_k+8 of each frame_num.

The pseudocode for case 2 will become:

```
for (i = 0; i<8; i++) {
  read_row ( )       -- reads the cells of a row of the
                        table and puts them in a 6-cell
                        register; before it would have loaded 8
                        cells
  compare (A[0],A[1],A[2],Temp)  -- compares the 3
                                    cells taken from the
                                    table, set in the
                                    register A with the 3
                                    cells of the estimate
                                    derived from the
                                    samples received
  if (Temp>cor_value) {
     cor_value = Temp    -- Note that it is necessary
     frame_num = 0          to specify appropriately
     row_index = i          where to read the data
     slot_num = 0           in the temporary register,
                            whereas the two comparison
                            operations should in any case
  }                         be performed
  A[2] = −A[2]     --This inversion of sign will, in
                     effect, be made as described
                     previously
  compare (A[0],A[1],A[2],Temp)
  if (Temp>cor_value) {
     cor_value = Temp
     frame_num = 0
     row_index = i
     slot_num = 1
  }
  compare (A[3],A[4],A[5],Temp)
  if (Temp>cor_value) {
     cor_value = Temp
     frame_num = 1
     row_index = i
     slot_num = 0
  }
  A[5] = −A[5]
  compare (A[3],A[4],A[5],Temp)
  if (Temp>cor_value) {
     cor_value = Temp
     frame_num = 0
     row_index = i
     slot_num = 1
  }
}
```

A possible alternative approach for the third reduction step of the second case can lead to 8 rows and 12 columns with two bits per cell (192 bits).

This approach keeps in memory the same number of bits as the preceding one, but has the same number of columns as the initial table. In fact, if the initial standard table is reorganized in such a way that the first, second and third codes of a generic codeset always fall within in the first, second and third columns of each subcase, the bits corresponding to the code index cannot be stored. This entails the introduction of an instruction in the pseudocode that will read in module 3 the position of each cell in the row loaded from the memory. In addition, the three cells that store the estimates obtained from the samples received must be ordered accordingly.

It is to be noted that the alternative approach does not enable a further reduction of memory to be obtained easily using the implementation of the operation f), which will be described in what follows. In regards to the implementation of the operation f), which modifies the search procedure, the search procedure is modified by introducing the information that the first two columns of the slot k of the first frame FR_1 differ from the first two columns of the slot k of the second frame FR_2 only in regards to the sign and the information that the two third columns are identical, and eliminate the first two columns of the slot k of the second frame FR_2. This determines a reduction from 8 rows by 6 columns to 8 rows by 3 columns (96 bits).

The pseudocode for the second case becomes:

```
for (i = 0; i<8; i++) {
  read_row ( )    -- reads the cells of a row of
                     the table and puts them in a 3-
                     cell register; before it would
                     have loaded 6 cells
  compare (A, Temp)  -- compares the 3 cells taken
                        from the table set in the
                        register A with the 3 cells
                        of the estimate derived from
                        the samples received
  if (Temp>cor_value) {
     cor_value = Temp    -- Note that it is necessary
     frame_num = 0          to specify appropriately
     row_index = i          where to read the data in the
     slot_num = 0           temporary register, whereas the
                            two comparison operations
  }                         should in any case be performed
  A[2] = −A[2]     -- This inversion of sign will, in
                     effect, be made as described
                     previously
  B[0] = −A[0]     -- There is to be noted the
                     introduction of a new temporary
                     register, but the total dimensions
  B[1] = −A[1]       of the two registers are equal to
  B[2] = A[2]        those used in the register of the
                     third approach.
  compare (A, Temp)
  if (Temp>cor_value) {
     cor_value = Temp
     frame_num = 0
     row_index = i
     slot_num = 1
  }
  compare (B, Temp)
  if (Temp>cor_value) {
     cor_value = Temp
     frame_num = 1
     row_index = i
     slot_num = 1
  }
  B[2] = −B[2]
  compare (B, Temp)
  if (Temp>cor_value) {
     cor_value = Temp
     frame_num = 0
     row_index = i
     slot_num = 0
  }
}
```

In regards to the steps g) and h) of the second case, which envisage mapping the sets of three of the rows 0,1,4,5,8,9, 12,13 of the one-slot table in the rows corresponding to the first frame of the two-slot table of the second case, as well as mapping the sets of three of the remaining codes in the sets of three corresponding to the second frame, swapping their position in pairs: 3, 2, 7, 6, 11, 10, 15, 14, these steps constitute a fourth reduction step that enables storing just one of the two tables, one for the first case and one for the second case, and obtaining the other one from the relations given above.

The pseudocode for obtaining the data in the first case, starting from the table of the second case, is the following:

```
for (i = 0; i<8; i++) {        -- now also for the first
                                  case at the most 8
                                  accesses to memory are
                                  required
   read_row ( )                -- reads the cells of a
                                  row of the table and puts
                                  them in a 3-cell register
   compare (A, Temp)           -- the case frame_1 is
                                  tested for the first row
                                  of the table of the first
                                  case
   if (Temp>cor_value)    {
      cor_value = Temp         -- a check is made to see if
      frame_num = 0               it is necessary to update the
      if (i even)                 info; for the maximum of
         row_index = i*2          correlation it is necessary
      else                        to consider the relations
         row_index = (I*2)-1      referred to above between the
   }                              rows of the two tables
   A[2] = -A[2]               -- This inversion of sign will, in
                                  effect, be performed as
                                  described previously
   compare (A, Temp)          -- the case frame-2 is tested
   if (Temp>cor_value)     {
      cor_value = Temp
      frame_num = 1
      if (i even)
         row_index = i*2
      else
         row_index = (i*2) -1
   }
   B[0] = -A[0]              -- There is to be noted the
   B[1] = -A[1]                 introduction of a new temporary
   B[2] = A[2]                  register, but the total dimensions
                                of the two registers are equal to
                                the ones used in the register of
                                solution 3,
   compare (B, Temp)          -- the frame-2 is tested for
                                 the row reconstructed in B
   if (Temp>cor_value)     {
      cor_value = Temp
      frame_num = 1
      if (i even)
         row_index = i*2 +3
      else
         row_index = (i*2)
   }
   B[2] = -B[2]
   compare (B, Temp)
   if (Temp>cor_value)     {
      cor_value = Temp
      frame_num = 0
      if (i even)
         row_index = i*2 +3
      else
         row_index = (i*2)
```

The approach just described enables considerable advantages to be achieved as compared to the known approaches. Provided here is an exemplification of the advantages in terms of memory required as compared to the architecture illustrated in FIG. 1. The application of the first three reduction steps in the first case leads to a reduction in the size of the table with one 192-bit slot, i.e., a reduction of 88.9% with respect to the initial size.

The application of the first three reduction steps in the second case leads to a reduction in the size of the table with two 192-bit slots, i.e., a reduction of 96.7% with respect to the initial size. In addition, the application of the fourth reduction step on the two-slot table leads to a reduction of 96.7%.

The reduction of the total memory on the two tables of the second step of the cell-search procedure is hence approximately 92%, while, if also the operations that envisage eliminating the one-slot table and keeping just the two-slot table are applied, a reduction of approximately 98% is achieved.

The above reductions in the size of the memory made possible by the method according to the invention determine a consistent reduction of the area used on the chip for calculation of the codegroup. Of course, without prejudice to the principle of the invention, the details of implementation and the embodiments may vary widely with respect to what is described and illustrated herein, without thereby departing from the scope of the present invention, as defined in the attached claims.

That which is claimed is:

1. A method for performing a cell search in a cellular communication system in which there are available synchronization sequences comprising synchronization codes for seeking correspondence in a received signal, the method comprising:
   identifying the synchronization codes received based upon a correlation process between the synchronization codes and the received signal; and
   obtaining from a correspondence table parameters for the cell search based upon the synchronization codes by
      identifying in the correspondence table at least one sub-table for reproducing the correspondence table based upon combination operations,
      storing the sub-tables and eliminating remaining parts of the correspondence table, and
      executing a search on the sub-tables, and including in the search the combination operations to reproduce the entire correspondence table.

2. A method according to claim 1, wherein the combination operations is based upon a set of additional information available when the search on the correspondence table is performed.

3. A method according to claim 1, wherein the synchronization sequence is a secondary synchronization sequence for executing a second step of the cell search, and wherein the correspondence table comprises a one-slot table for carrying out the cell search when the secondary synchronization sequence is transmitted in one slot for each frame of the signal received.

4. A method according to claim 3, wherein the one-slot table comprises a division between a first frame and a second frame and columns corresponding to the parameters of a codegroup, a codeset and an offset time, and wherein the combination operations is based upon the one-slot table and eliminating the remaining parts of the correspondence table comprises at least one of the following operations:
   eliminating a column corresponding to the codegroup, and obtaining a value of the codegroup from a row index;
   eliminating a column corresponding to the offset time, and obtaining the offset time from the row index by the following relation:

$$toffset = \begin{Bmatrix} 48 \cdot a, a < 16 \\ 720 + 48 \cdot a, a \geq 16 \end{Bmatrix}$$

reducing the one-slot table to sixteen rows that contain the first instance of a combination of phases;
   obtaining the offset time from the codegroup by the preceding relation, and substituting the codegroup for the row index by the relation codegroup=row_index+ 16*codeset;

eliminating the columns of the second frame that are identical to the columns of the first frame, with the columns being the first two, and introducing the information on the identity into the search; and modifying the search by introducing the information that a last column of the second frame differs from a last column of the first frame in regards to a sign, and eliminating the last column of the second frame.

5. A method according to claim 1, wherein the synchronization sequence is a secondary synchronization sequence for executing a second step of the cell search, and wherein the correspondence table comprises a two-slot table for carrying out the cell search when the secondary synchronization sequence is transmitted in two slots for each frame of the signal received.

6. A method according to claim 5, wherein the two-slot table comprises a division between a first slot and a second slot, a division between a first frame and a second frame, columns corresponding to the parameters of a codegroup, a codeset, and an offset time, and wherein the combination operations is based upon the two-slot table and eliminating the remaining parts of the correspondence table comprises at least one of the following operations:

eliminating the column corresponding to the codegroup, and obtaining a value of the codegroup from the row index;

eliminating the column corresponding to the offset time, and obtaining the offset time from the row index by the following relation:

$$toffset = \begin{Bmatrix} 48 \cdot a, a < 16 \\ 720 + 48 \cdot a, a \geq 16 \end{Bmatrix}$$

reducing the table to eight rows that contain a first instance of a combination of phases;

obtaining the offset time from the codegroup by the preceding relation, and substituting the codegroup for the row index by the relation codegroup=row_index+ 16*codeset;

eliminating two columns of the second slot that are identical to the columns of the first slot, with the two columns being the first two, and introducing the information on the identity into the search;

modifying the search by introducing the information that a last column of the second slot differs from a last column of the first slot in regards to the sign, and eliminating the last column of the second slot; and modifying the search by introducing the information that the first two columns of the first slot of the first frame differ from the first two columns of the first slot of the second frame in regards to the sign and the information that the two third columns are identical, and eliminating the first two columns of the first slot of the second frame.

7. A method according to claim 6, further comprising the following operations:

mapping the codes of the rows 0, 1, 4, 5, 8, 9, 12, 13 of the one-slot table in the rows corresponding to the first frame of the two-slot table; and mapping the remaining codes in the sets of three corresponding to the second frame, swapping their position in pairs 3, 2, 7, 6, 11, 10, 15, 14 to store one between the two tables for the second step of the cell search, in particular the two-slot table, and to obtain from the stored table the remaining table.

8. A method according to claim 1, wherein the synchronization sequence comprises a sequence for executing a third step of the cell search, wherein the identification codes are midamble codes, wherein the correspondence table comprises columns corresponding to the parameters of a codegroup, scrambling codes, midamble codes, and an offset time, and wherein the combination operations is based upon the one-slot table and comprises at least one of the following operations:

eliminating the column corresponding to the codegroup, and obtaining a value of the codegroup from a row index; and eliminating the column corresponding to the offset time, and obtaining the offset time from the row index.

9. A circuit for carrying out a cell search procedure in a cellular communication system in which there are available synchronization sequences comprising synchronization codes corresponding to a received signal, the circuit comprising:

a correlation module for identifying the synchronization codes received based upon a correlation between the synchronization codes and the signal received; and a comparison module for identifying parameters for the cell search based upon identification codes in a correspondence table stored therein, said comparison module identifying in the correspondence table at least one sub-table for reproducing the correspondence table based upon a combination operations, storing the sub-tables and eliminating remaining parts of the correspondence table, and executing a search on the sub-tables, and including in the search the combination operations to reproduce the entire correspondence table.

10. A circuit according to claim 9, wherein the combination operations is based upon a set of additional information available when the search on the correspondence table is performed.

11. A circuit according to claim 9, wherein the synchronization sequence is a secondary synchronization sequence for executing a second step of the cell search, and wherein the correspondence table comprises a one-slot table for carrying out the cell search when the secondary synchronization sequence is transmitted in one slot for each frame of the signal received.

12. A circuit according to claim 11, wherein the one-slot table comprises a division between a first frame and a second frame and columns corresponding to the parameters of a codegroup, a codeset and an offset time, and wherein the combination operations is based upon the one-slot table and eliminating the remaining parts of the correspondence table comprises at least one of the following operations:

eliminating a column corresponding to the codegroup, and obtaining a value of the codegroup from a row index;

eliminating a column corresponding to the offset time, and obtaining the offset time from the row index by the following relation:

$$toffset = \begin{Bmatrix} 48 \cdot a, a < 16 \\ 720 + 48 \cdot a, a \geq 16 \end{Bmatrix}$$

reducing the one-slot table to sixteen rows that contain the first instance of a combination of phases;

obtaining the offset time from the codegroup by the preceding relation1 and substituting the codegroup for the row index by the relation codegroup=row_index+ 16*codeset;

eliminating the columns of the second frame that are identical to the columns of the first frame, with the columns being the first two, and introducing the information on the identity into the search; and modifying the search by introducing the information that a last column of the second frame differs from a last column of the first frame in regards to a sign, and eliminating the last column of the second frame.

13. A circuit according to claim 9, wherein the synchronization sequence is a secondary synchronization sequence for executing a second step of the cell search, and wherein the correspondence table comprises a two-slot table for carrying out the cell search when the secondary synchronization sequence is transmitted in two slots for each frame of the signal received.

14. A circuit to claim 13, wherein the two-slot table comprises a division between a first slot and a second slot, a division between a first frame and a second frame, columns corresponding to the parameters of a codegroup, a codeset, and an offset time, and wherein the combination operations is based upon the two-slot table and eliminating the remaining parts of the correspondence table comprises at least one of the following operations:

eliminating the column corresponding to the codegroup, and obtaining a value of the codegroup from the row index;

eliminating the column corresponding to the offset time, and obtaining the offset time from the row index by the following relation:

$$toffset = \begin{cases} 48 \cdot a, a < 16 \\ 720 + 48 \cdot a, a \geq 16 \end{cases}$$

reducing the table to eight rows that contain a first instance of a combination of phases;

obtaining the offset time from the codegroup by the preceding relation, and substituting the codegroup for the row index by the relation codegroup=row_index+ 16*codeset;

eliminating two columns of the second slot that are identical to the columns of the first slot, with the two columns being the first two, and introducing the information on the identity into the search;

modifying the search by introducing the information that a last column of the second slot differs from a last column of the first slot in regards to the sign, and eliminating the last column of the second slot; and modifying the search by introducing the information that the first two columns of the first slot of the first frame differ from the first two columns of the first slot of the second frame in regards to the sign and the information that the two third columns are identical, and eliminating the first two columns of the first slot of the second frame.

15. A circuit according to claim 14, wherein said comparison module further performs the following operations:

mapping the codes of the rows 0, 1, 4, 5, 8, 9, 12, 13 of the one-slot table in the rows corresponding to the first frame of the two-slot table; and mapping the remaining codes in the sets of three corresponding to the second frame, swapping their position in pairs 3, 2, 7, 6, 11, 10, 15, 14 to store one between the two tables for the second step of the cell search, in particular the two-slot table, and to obtain from the stored table the remaining table.

16. A circuit according to claim 9, wherein the synchronization sequence comprises a sequence f or executing a third step of the cell search, wherein the identification codes are midamble codes, wherein the correspondence table comprises columns corresponding to the parameters of a codegroup, scrambling codes, midamble codes, and an offset time, and wherein the combination operations is based upon the one-slot table and comprises at least one of the following operations:

eliminating the column corresponding to the codegroup, and obtaining a value of the codegroup from a row index; and eliminating the column corresponding to the offset time, and obtaining the offset time from the row index.

17. A computer-readable medium having stored thereon a data structure for performing a cell search in a cellular communication system in which there are available synchronization sequences comprising synchronization codes corresponding to a received signal, the computer-readable medium comprising:

a first data field containing data for identifying the synchronization codes received based upon a correlation process between the synchronization codes and the received signal; and a second data field containing data for obtaining from a correspondence table parameters for the cell search based upon the synchronization codes by identifying in the correspondence table at least one sub-table for reproducing the correspondence table based upon a combination operations, storing the sub-tables and eliminating remaining parts of the correspondence table, and executing a search on the sub-tables, and including in the search the combination operations to reproduce the entire correspondence table.

18. A computer-readable medium according to claim 17, wherein the combination operations is based upon a set of additional information available when the search on the correspondence table is performed.

19. A computer-readable medium according to claim 17, wherein the synchronization sequence is a secondary synchronization sequence for executing a second step of the cell search, and wherein the correspondence table comprises a one-slot table for carrying out the cell search when the secondary synchronization sequence is transmitted in one slot for each frame of the signal received.

20. A computer-readable medium according to claim 19, wherein the one-slot table comprises a division between a first frame and a second frame and columns corresponding to the parameters of a codegroup, a codeset and an offset time, and wherein the combination operations is based upon the one-slot table and eliminating the remaining parts of the correspondence table comprises at least one of the following operations:

eliminating a column corresponding to the codegroup, and obtaining a value of the codegroup from a row index;

eliminating a column corresponding to the offset time, and obtaining the offset time from the row index by the following relation:

$$toffset = \begin{cases} 48 \cdot a, a < 16 \\ 720 + 48 \cdot a, a \geq 16 \end{cases}$$

reducing the one-slot table to sixteen rows that contain the first instance of a combination of phases;

obtaining the offset time from the codegroup by the preceding relation, and substituting the codegroup for the row index by the relation codegroup=row_index+ 16*codeset;

eliminating the columns of the second frame that are identical to the columns of the first frame, with the columns being the first two, and introducing the information on the identity into the search; and modifying the search by introducing the information that a last column of the second frame differs from a last column of the first frame in regards to a sign, and eliminating the last column of the second frame.

21. A computer-readable medium according to claim 17, wherein the synchronization sequence is a secondary synchronization sequence for executing a second step of the cell search, and wherein the correspondence table comprises a two-slot table for carrying out the cell search when the secondary synchronization sequence is transmitted in two slots for each frame of the signal received.

22. A computer-readable medium according to claim 21, wherein the two-slot table comprises a division between a first slot and a second slot, a division between a first frame and a second frame, columns corresponding to the parameters of a codegroup, a codeset, and an offset time, and wherein the combination operations is based upon the two-slot table and eliminating the remaining parts of the correspondence table comprises at least one of the following operations:

eliminating the column corresponding to the codegroup, and obtaining a value of the codegroup from the row index;

eliminating the column corresponding to the offset time, and obtaining the offset time from the row index by the following relation:

$$toffset = \begin{cases} 48 \cdot a, a < 16 \\ 720 + 48 \cdot a, a \geq 16 \end{cases}$$

reducing the table to eight rows that contain a first instance of a combination of phases;

obtaining the offset time from the codegroup by the preceding relation, and substituting the codegroup for the row index by the relation codegroup=row_index+ 16*codeset;

eliminating two columns of the second slot that are identical to the columns of the first slot, with the two columns being the first two, and introducing the information on the identity into the search;

modifying the search by introducing the information that a last column of the second slot differs from a last column of the first slot in regards to the sign, and eliminating the last column of the second slot; and modifying the search by introducing the information that the first two columns of the first slot of the first frame differ from the first two columns of the first slot of the second frame in regards to the sign and the information that the two third columns are identical, and eliminating the first two columns of the first slot of the second frame.

23. A computer-readable medium according to claim 22, further comprising the following operations:

mapping the codes of the rows 0, 1, 4, 5, 8, 9, 12, 13 of the one-slot table in the rows corresponding to the first frame of the two-slot table; and mapping the remaining codes in the sets of three corresponding to the second frame, swapping their position in pairs 3, 2, 7, 6, 11, 10, 15, 14 to store one between the two tables for the second step of the cell search, in particular the two-slot table, and to obtain from the stored table the remaining table.

24. A computer-readable medium according to claim 17, wherein the synchronization sequence comprises a sequence for executing a third step of the cell search, wherein the identification codes are midamble codes, wherein the correspondence table comprises columns corresponding to the parameters of a codegroup, scrambling codes, midamble codes, and an offset time, and wherein the combination operations is based upon the one-slot table and comprises at least one of the following operations:

eliminating the column corresponding to the codegroup, and obtaining a value of the codegroup from a row index; and eliminating the column corresponding to the offset time, and obtaining the offset time from the row index.

* * * * *

UNITED STATES PATENT AND TRADEMARK OFFICE
CERTIFICATE OF CORRECTION

PATENT NO. : 7,333,470 B2  Page 1 of 1
APPLICATION NO. : 10/841414
DATED : February 19, 2008
INVENTOR(S) : Rimi et al.

It is certified that error appears in the above-identified patent and that said Letters Patent is hereby corrected as shown below:

| | |
|---|---|
| Column 9, Line 44 | Delete: "cor value"<br>Insert: -- cor-value -- |
| Column 13, Line 50 | Delete: "in" |
| Column 19, Line 2 | Delete: "relation1"<br>Insert: -- relation, -- |
| Column 20, Line 7 | Delete: "f or"<br>Insert: -- for -- |

Signed and Sealed this

Twenty-sixth Day of August, 2008

JON W. DUDAS
*Director of the United States Patent and Trademark Office*